(12) United States Patent
Nakaso (10) Patent No.: US 9,342,739 B2
(45) Date of Patent: May 17, 2016

(54) CHARACTER RECOGNITION APPARATUS, NON-TRANSITORY COMPUTER READABLE MEDIUM, AND CHARACTER RECOGNITION METHOD

(71) Applicant: FUJI XEROX CO., LTD., Tokyo (JP)

(72) Inventor: Suguru Nakaso, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 59 days.

(21) Appl. No.: 13/901,048

(22) Filed: May 23, 2013

(65) Prior Publication Data

US 2014/0105501 A1 Apr. 17, 2014

(30) Foreign Application Priority Data

Oct. 11, 2012 (JP) .................. 2012-226176

(51) Int. Cl.
*G06K 9/00* (2006.01)
*G06K 9/34* (2006.01)

(52) U.S. Cl.
CPC ............ *G06K 9/00402* (2013.01); *G06K 9/344* (2013.01); *G06K 2209/01* (2013.01)

(58) Field of Classification Search
None
See application file for complete search history.

(56) References Cited

U.S. PATENT DOCUMENTS

| | | | | |
|---|---|---|---|---|
| 5,185,821 A | * | 2/1993 | Yoda | 382/306 |
| 5,812,697 A | * | 9/1998 | Sakai et al. | 382/186 |
| 5,850,480 A | * | 12/1998 | Scanlon | 382/229 |
| 5,852,676 A | * | 12/1998 | Lazar | G06K 9/00456 382/138 |
| 6,341,176 B1 | * | 1/2002 | Shirasaki et al. | 382/229 |
| 6,614,929 B1 | * | 9/2003 | Yokota | 382/175 |
| 6,618,504 B1 | * | 9/2003 | Yoshino | 382/187 |
| 6,766,069 B1 | * | 7/2004 | Dance et al. | 382/309 |
| 7,327,883 B2 | * | 2/2008 | Polonowski | 382/182 |
| 8,050,500 B1 | * | 11/2011 | Batty et al. | 382/187 |
| 2005/0196074 A1 | * | 9/2005 | Deere | G06K 9/2054 382/305 |
| 2006/0291692 A1 | * | 12/2006 | Nakao | G06K 9/6807 382/101 |
| 2007/0206884 A1 | * | 9/2007 | Kato | 382/305 |
| 2010/0303382 A1 | * | 12/2010 | Tamura | 382/278 |
| 2011/0075932 A1 | * | 3/2011 | Komaki | 382/190 |
| 2011/0158548 A1 | * | 6/2011 | Aizawa | G06K 9/723 382/229 |

(Continued)

FOREIGN PATENT DOCUMENTS

| | | |
|---|---|---|
| JP | H06-124366 A | 5/1994 |
| JP | A-7-39816 | 2/1995 |

(Continued)

OTHER PUBLICATIONS

(English translation provided of JP 2001-222679A as cited in the IDS dated Mar. 8, 2016; hereinafter Toshiharu).*
Jan. 5, 2016 Office Action issued in Japanese Application No. 2012-226176.

*Primary Examiner* — Bhavesh Mehta
*Assistant Examiner* — Narek Zohrabyan
(74) *Attorney, Agent, or Firm* — Oliff PLC (57) ABSTRACT

A character recognition apparatus includes an extracting unit that extracts a numerical value reading region in which a numerical value that is a character string of a numeral is read from an image that is a character recognition target, a character recognizing unit that performs character recognition on the extracted numerical value reading region and obtains plural recognition candidates for each numerical value, and a selecting unit that selects a potential candidate from the plural recognition candidates on the basis of a numerical value range set for each numerical value reading region.

12 Claims, 8 Drawing Sheets

(56) References Cited

U.S. PATENT DOCUMENTS

2012/0140979 A1* 6/2012 Nishiwaki .................... 382/101
2012/0243056 A1* 9/2012 Yamaguchi ........ G07D 11/0069
    358/462
2013/0188872 A1* 7/2013 Masuko ....................... 382/182

FOREIGN PATENT DOCUMENTS

| | | |
|---|---|---|
| JP | A-7-114616 | 5/1995 |
| JP | H09-81653 A | 3/1997 |
| JP | 2001-222679 A | 8/2001 |
| JP | A-2002-92546 | 3/2002 |

* cited by examiner

| ORDER | RECOGNITION CANDIDATE |
|---|---|
| 1 | 467 |
| 2 | 4. 67 |
| 3 | 487 |
| 4 | 4. 87 |
| 5 | 46. 7 |

FIG. 7B

| ORDER | RECOGNITION CANDIDATE |
|---|---|
| 1 | 4. 67 |
| 2 | 4. 87 |

CHARACTER RECOGNITION APPARATUS, NON-TRANSITORY COMPUTER READABLE MEDIUM, AND CHARACTER RECOGNITION METHOD

CROSS-REFERENCE TO RELATED APPLICATIONS

This application is based on and claims priority under 35 USC 119 from Japanese Patent Application No. 2012-226176 filed Oct. 11, 2012.

BACKGROUND

Technical Field

The present invention relates to a character recognition apparatus, a non-transitory computer readable medium, and a character recognition method.

SUMMARY

According to an aspect of the invention, there is provided a character recognition apparatus including: an extracting unit that extracts a numerical value reading region in which a numerical value that is a character string of a numeral is read from an image that is a character recognition target; a character recognizing unit that performs character recognition on the extracted numerical value reading region and obtains plural recognition candidates for each numerical value; and a selecting unit that selects a potential candidate from the plural recognition candidates on the basis of a numerical value range set for each numerical value reading region.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the invention will be described in detail referring to accompanying drawings.

<Handwriting Input System>

First, an example of a system that includes a character recognition apparatus according to an exemplary embodiment of the invention will be described.

Figure 1:
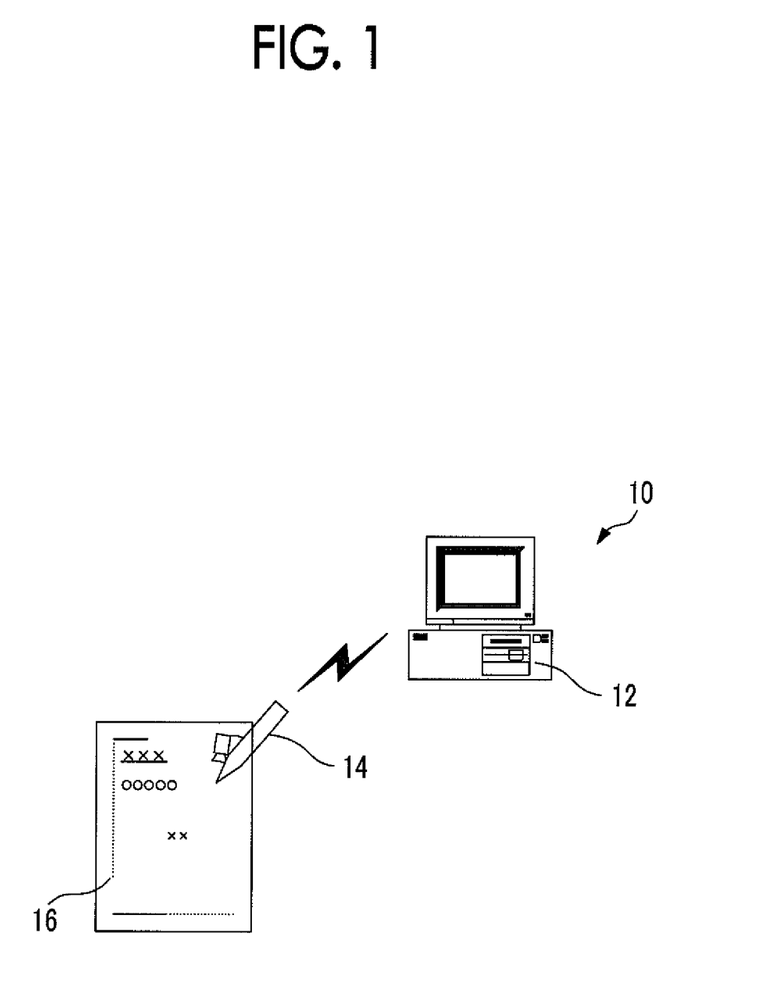
FIG. 1 is a diagram schematically showing an example of a handwriting input system including a character recognition apparatus according to an exemplary embodiment of the invention.

FIG. 1 is a diagram schematically showing an example of a handwriting input system that includes a character recognition apparatus according to an exemplary embodiment of the invention. As shown in FIG. 1, a handwriting input system includes a character recognition apparatus 12 and an electronic pen 14. The electronic pen 14 performs communication with the character recognition apparatus 12 through a wired or wireless communication line (not shown). The character recognition apparatus 12 corresponds to an information processing apparatus such as a computer and a peripheral used by a user. The electronic pen 14 serves as a writing material through which the user performs writing on a recording medium 16 using ink. In addition, the electronic pen 14 serves as a pen-type image reading apparatus that captures an image of the recording medium 16 around a pen tip in writing and obtains handwriting information from the captured image.

In the handwriting input system 10, the user performs writing on the recording medium 16 using the electronic pen 14. The electronic pen 14 captures the image on the recording medium 16 around the pen tip in writing, and obtains handwriting information indicating a movement track of the pen tip from the captured image. The obtained handwriting information is transmitted to the character recognition apparatus 12. The character recognition apparatus 12 generates a handwriting image on the basis of the received handwriting information, and performs a character recognition process on the handwriting image to obtain text information. That is, the image information about the handwriting image is converted into the text information (text data).

Figure 6A:
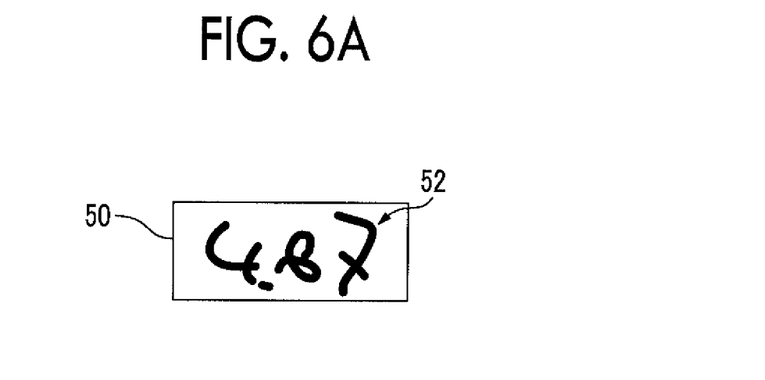
FIGS. 6A to 6C are diagrams schematically showing a character recognition procedure of a character string that represents a numerical value, and are diagram schematically showing an example of a unit pattern that forms a coded image.

In many cases, a numerical value (a character string of a numeral) includes a sign that represents the number of digits such as a comma or a decimal point and a sign that represents positive or negative such as plus or minus, and thus, the recognition rate is low. In particular, as shown in FIG. 6A, it is difficult to read a handwritten input numerical value at first sight, and thus the recognition rate of the handwritten input numerical value is further reduced. In the present embodiment, a numerical value range is set with respect to a numerical value reading region to perform a "numerical value recognition process" of performing the character recognition again, to thereby improve the recognition rate of the numerical value in the character recognition process.

The handwriting input system 10 shown in FIG. 1 is an example of a configuration in which the character recognition apparatus 12 obtains the image information about the handwriting image. In the present embodiment, it is preferable that the character recognition apparatus 12 obtains image information about a text image that includes a numerical value. The image information about the text image is neither limited to the image information obtained from the electronic pen, nor to the image information about the handwriting information. The character recognition apparatus 12 may obtain image information about a text image from an external apparatus besides the electronic pen. Here, as the external apparatus, an image reading apparatus such as a scanner, a different information processing apparatus, or the like may be used.

<Character Recognition Apparatus>

(Configuration of Character Recognition Apparatus)

Next, a configuration of the character recognition apparatus 12 will be described.

Figure 2:
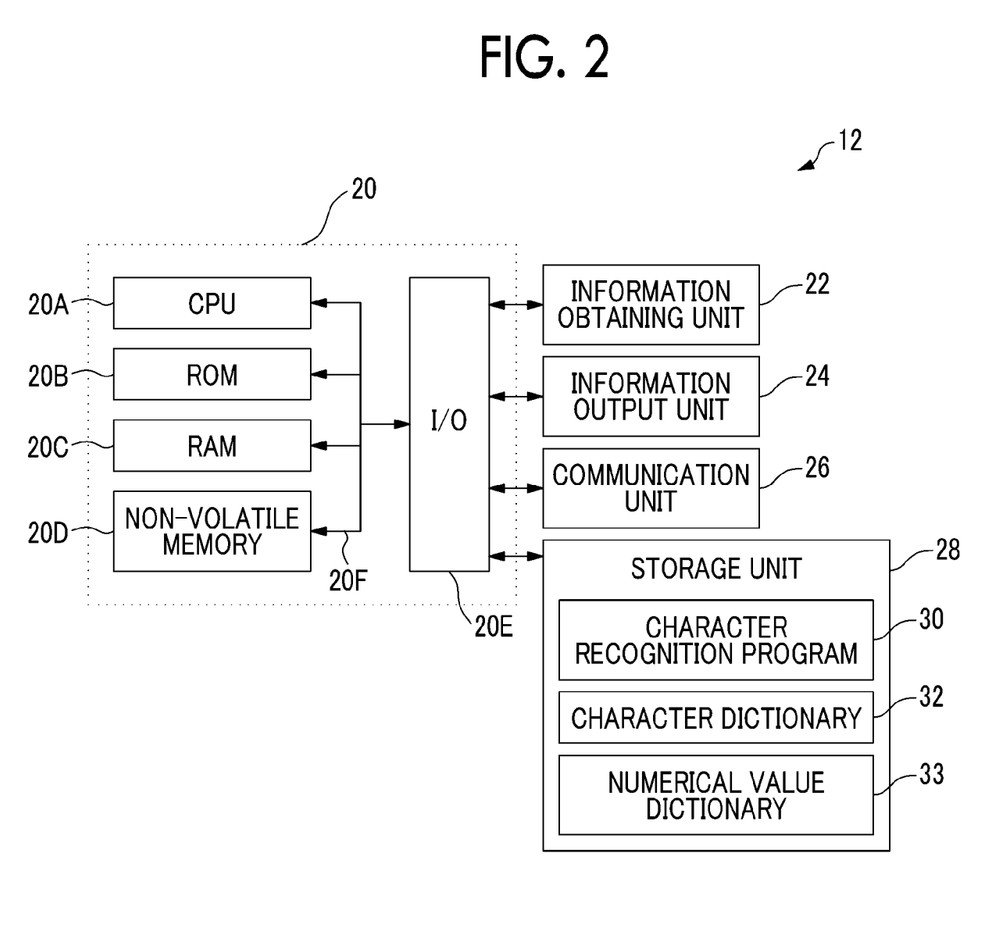
FIG. 2 is a block diagram showing an example of a configuration of a control system of a character recognition apparatus according to an exemplary embodiment of the invention.

FIG. 2 is a block diagram illustrating an example of a configuration of a control system of a character recognition apparatus according to an exemplary embodiment of the invention. As shown in FIG. 2, the character recognition apparatus 12 includes a control unit 20, an information obtaining unit 22, an information output unit 24, a communication unit 26, and a storage unit 28. The configuration of the character recognition apparatus 12 is an example, and an unnecessary functional unit may be removed, a new functional unit may be added, or the configuration and arrangement of the respective units may be modified.

The control unit 20 is configured as a computer that performs control of the overall apparatus and various calculations. That is, the control unit 20 includes a CPU 20A, a ROM 20B that stores various programs, a RAM 20C that is used as a work area in execution of the program, a non-volatile memory 20D that stores various information, and an I/O 20E. The CPU 20A, the ROM 20B, the RAM 20C, the non-volatile memory 20D and the I/O 20E are connected to each other through a bus 20F.

The respective units of the information obtaining unit 22, the information output unit 24, the communication unit 26 and the storage unit 28 are connected to the I/O 203 of the control unit 20. The control unit 20 performs information reception and transmission between the respective units of the information obtaining unit 22, the information output unit 24, the communication unit 26 and the storage unit 28, to control the respective units.

The information obtaining unit 22 obtains information according to an operation of the user. The information output unit 24 outputs information according to an operation of the user. The obtained information and the output information include various information such as electronic information, text information, image information and sound information.

As the information obtaining unit 22, a mouse, a keyboard, a scanner, a microphone, a camera, various drives, or the like may be used. As the information output unit 24, an image display unit such as a display, an image output unit such as a printer, and a sound output unit such as a speaker may be used. In the present embodiment, an example in which an operating unit such as a mouse or a keyboard is provided as the information obtaining unit 22 and an image display unit such as a display is provided as the information output unit 24 will be described.

The communication unit 26 is an interface that performs communication with an external apparatus through a wired or wireless communication line. The storage unit 28 is a storage unit such as a hard disk. Various programs or various data are stored in the storage unit 28. In the present embodiment, a character recognition program 30 that executes the "character recognition process" to be described later, a character dictionary 32 for the character recognition process, a numeral dictionary 33, and the like are stored.

In the present embodiment, a case where a control program such as the character recognition program 30 is stored in advance in the storage unit 28 is described, but the control program may be stored in a different storage unit such as the ROM 20B, the non-volatile memory 20D or the like. Further, the control program may be obtained from the outside through the information obtaining unit 22 or the communication unit 26. For example, the control program may be obtained from an information recording medium such as a CD-ROM through various drives that form the information obtaining unit 22.

Further, in the present embodiment, image information relating to a text image that is a character recognition target may also be obtained in advance to be stored in the storage unit 28, or may be obtained from the outside through the information obtaining unit 22 or the communication unit 26. For example, in the system shown in FIG. 1, the handwriting image is generated on the basis of the handwriting information obtained from the electronic pen through the communication unit 26, in which the handwriting image is the character recognition target.

(Character Recognition Process)

Next, the "character recognition process" performed by the character recognition apparatus 12 will be described.

Figure 3:
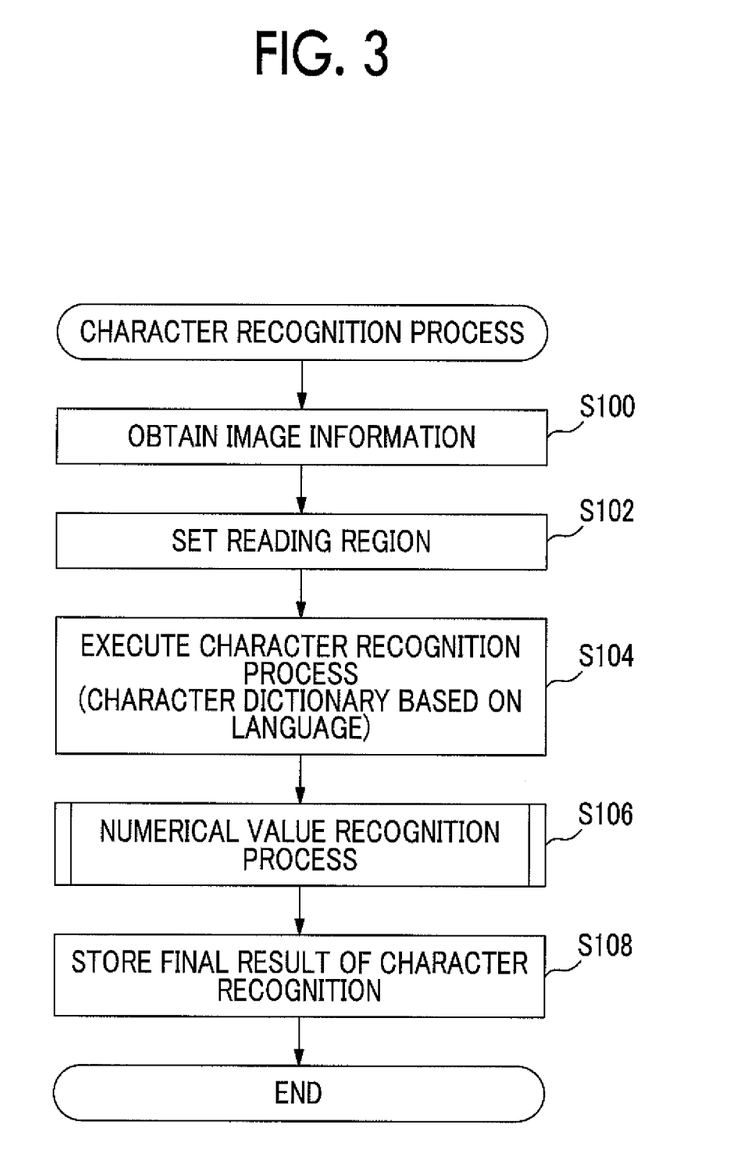
FIG. 3 is a flowchart showing an example of a processing routine of a character recognition process.

FIG. 3 is a flowchart illustrating an example of a processing routine of the "character recognition process". The "character recognition process" is executed by the CPU 20A of the control unit 20. The "character recognition process" is started if a text image that is a character recognition target is specified and the execution of the character recognition process is instructed by a user, through the operating unit that forms the information obtaining unit 22.

First, in step 100, image information relating to a text image that is a character recognition target is obtained. Then, in step S102, a text region is extracted from the text image that is the character recognition target and a reading region is set. Next, in step 104, with respect to the set reading region, the character recognition process is executed using the character dictionary and the numeral dictionary. Then, in step 106, a numerical value range is set with respect to a numerical value reading region to execute a "numerical value recognition process" in which the character recognition is performed again. The numerical value recognition process will be described in detail later. Finally, in step 108, a final result of the character recognition in which a result of the numerical value recognition process is reflected is stored, and the routine is terminated.

(Numerical Value Recognition Process)

Here, the "numerical value recognition process" will be described.

Figure 4:
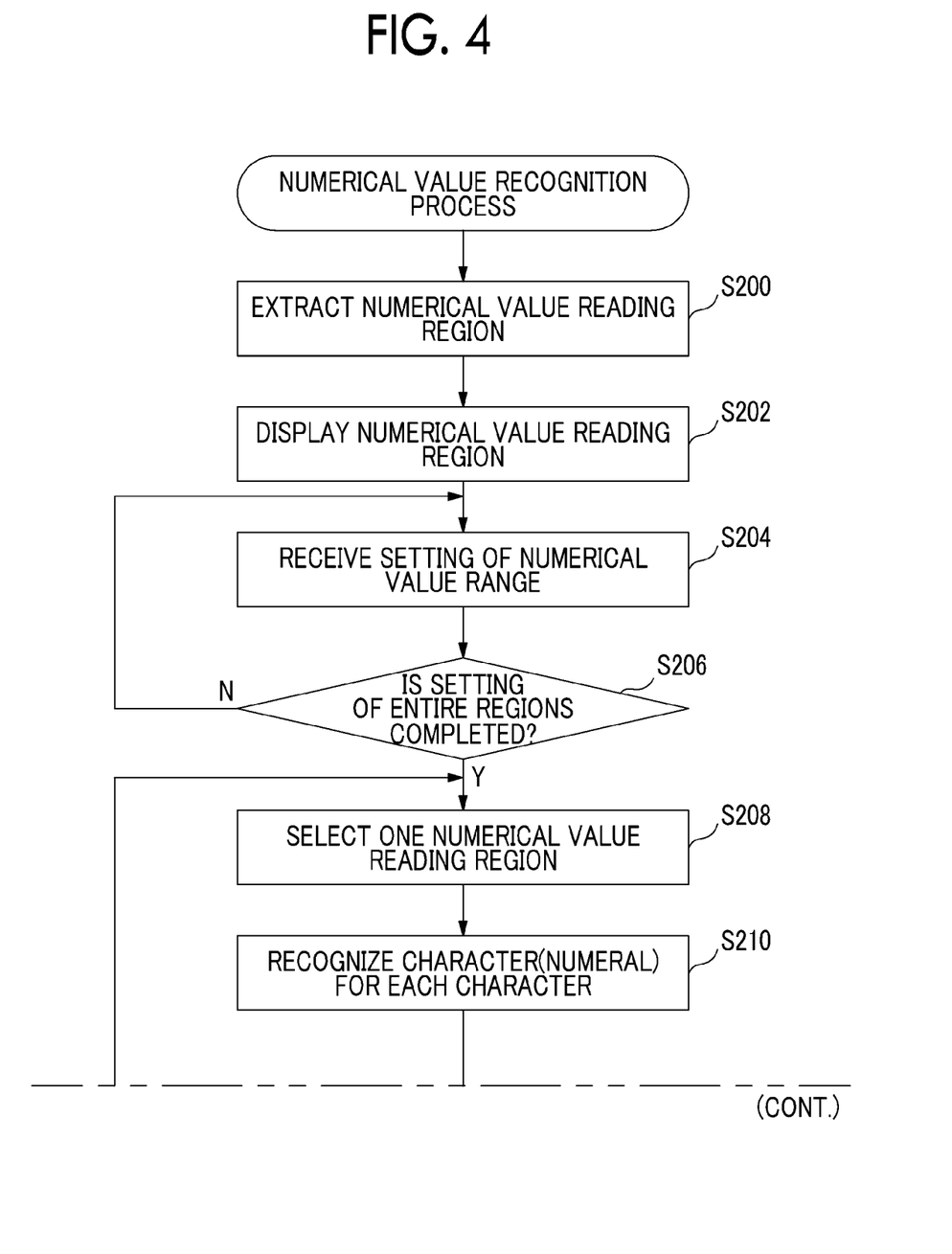
FIG. 4 is a flowchart showing an example of a processing routine of a numerical value recognition process.
Figure 5A:
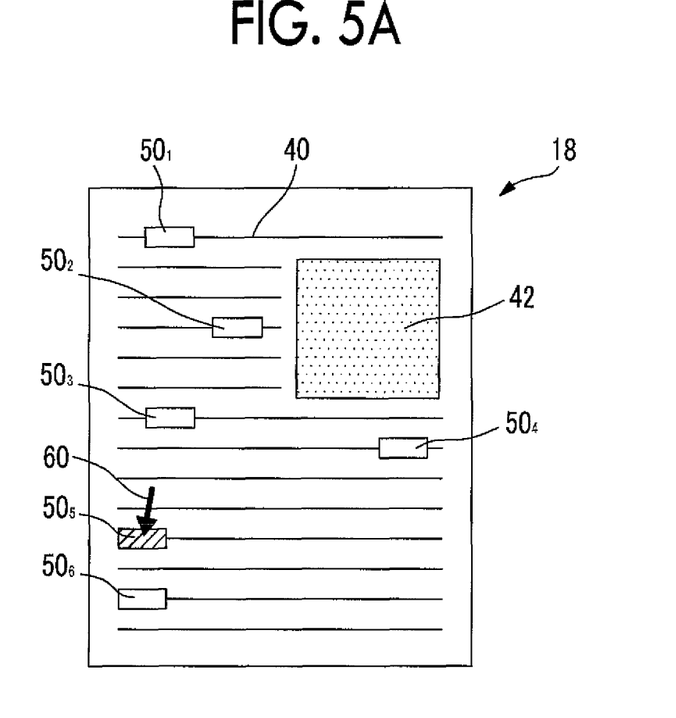
FIG. 5A is a diagram schematically showing an example of a displayed character image.
Figure 5B:
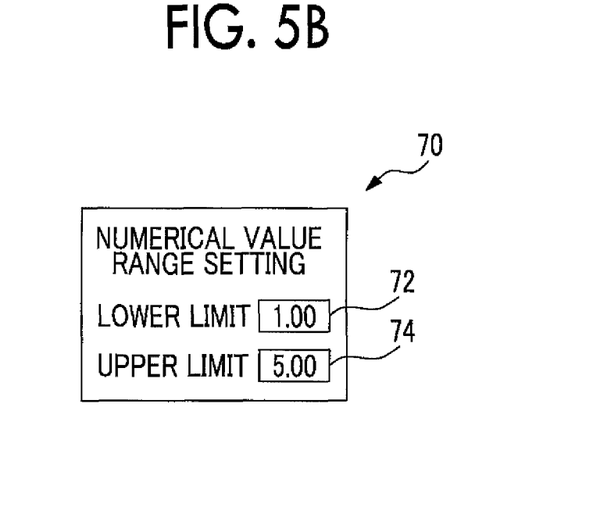
FIG. 5B is a diagram schematically showing an example of a setting method of a numerical value range.
Figure 6B:
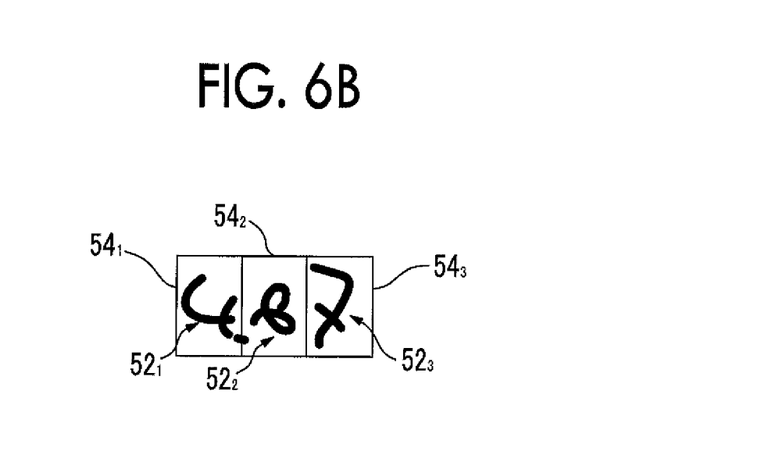
Figure 6C:
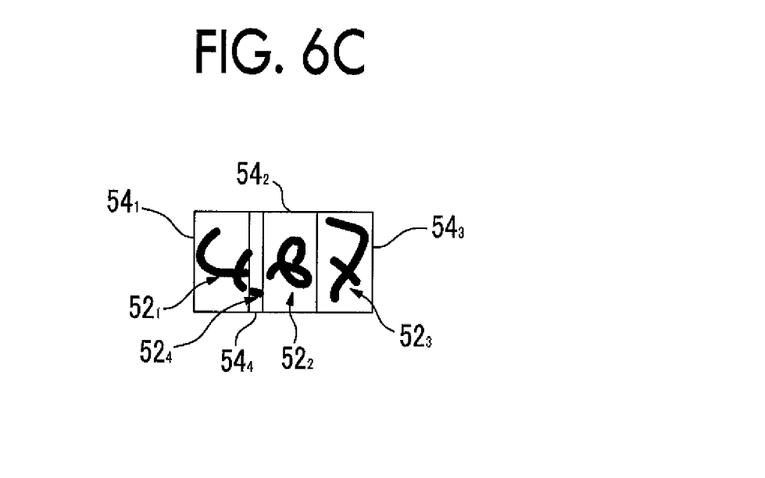
Figure 7A:
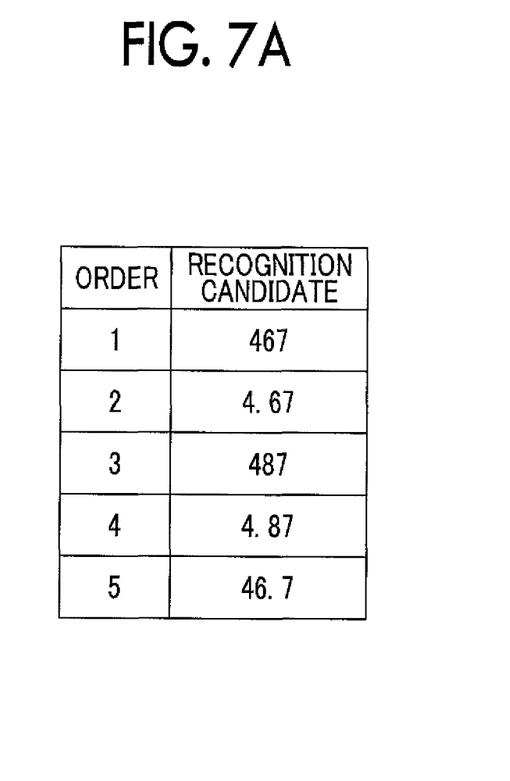
FIG. 7A is a diagram showing the order of recognition candidates before the numerical value recognition process.
Figure 7B:
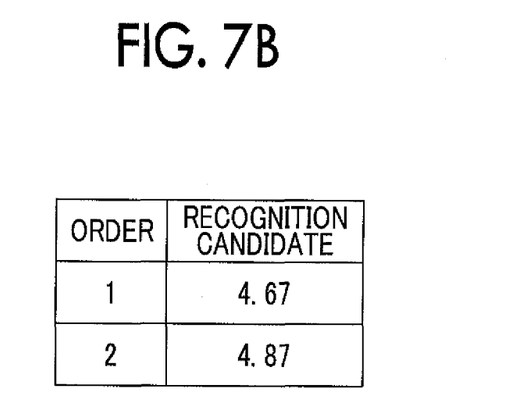
FIG. 7B is a diagram showing the order of the recognition candidates after the numerical value recognition process.

FIG. 4 is a flowchart illustrating an example of a processing routine of the numerical value recognition process. FIG. 5A is a diagram schematically showing an example of a displayed text image, and FIG. 5B is a diagram schematically showing an example of a setting method of a numerical value range. FIGS. 6A to 6C are diagrams schematically showing a character recognition procedure of a character string that represents a numerical value. FIG. 7A is a diagram showing the order of recognition candidates before the numerical value recognition process, and FIG. 7B is a diagram showing the order of the recognition candidates after the numerical value recognition process.

As shown in FIG. 4, first, in step 200, the numerical value reading region where a numerical value is read from the text image that is the character recognition target is extracted. Then, in step 202, the numerical value reading region is displayed on the image display unit. Next, in step 204, a setting screen for setting the numerical value range for each numerical value reading region is displayed to be set by a user.

For example, as shown in FIG. 5A, a text image 18 is displayed on the image display unit. The text image 18 includes a text region 40 indicated by a solid line and a graphic region 42 indicated by shading. The text region 40 is configured by a character string (that may include a numeral and a sign) The graphic region 42 is configured of an object besides the character string, such as a figure or a photograph.

The text region 40 includes plural numerical value reading regions 50. In the example shown in FIG. 5A, six numerical value reading regions $50_1$ to $50_6$ are shown as a rectangular region. In a case where it is not necessary to discriminate the respective regions, the regions are collectively referred to as the numerical value reading regions 50. As the user operates the operating unit, the numerical value reading regions 50 are specified. In the example shown in FIG. 5A, the numerical value reading region $50_5$ is specified by a specifying unit 60 such as a cursor, and is displayed with a color different from that of the other numerical value reading regions 50.

If the numerical value reading region 50 is specified, for example, as shown in FIG. 5B, a setting screen 70 for setting a numerical value range with respect to the specified region is displayed. In the example shown in FIG. 5B, the setting screen 70 includes a box 72 for setting a lower limit value of the numerical value range and a box 74 for setting an upper limit value of the numerical value range. For example, by setting the lower limit value of the numerical value range to "1.00", and by setting the upper limit value to "5.00", the numerical value range is set to the range of 1.00 to 5.00.

Returning to FIG. 4, in step 206, it is determined whether the setting of the numerical value range is completed with respect to the entire numerical value reading regions 50. In a case where the setting of the numerical value range is completed, the procedure proceeds to step 208. Until the setting of the numerical value range is completed, the determination in step 206 is repeated.

Next, in step 208, one numerical value reading region 50 is selected. Then, in step 210, the character recognition is performed on each character with respect to the numerical value of the selected numerical value reading region 50. In step 212, plural recognition candidates are obtained with respect to a numerical value that is a character string of a numeral. Then, step 214, recognition candidates that do not belong to the set numerical value range are excluded from the plural recognition candidates, to thereby narrow the recognition candidates. Then, in step 216, the candidate with the most potential for recognition is selected from among the narrowed recognition candidates.

For example, as shown in FIG. 6A, the numerical value reading region 50 includes an image of a numerical value 52. In the example shown in FIG. 6A, the numerical value 52 is "4.67", which is a character string that includes four characters of "4", ".", "6" and "7". In character recognition, the numerical value reading region 50 is divided into a character region corresponding to one character, and then, the character recognition is performed on each character.

As shown in FIG. 6C, in character recognition in which the narrowing is performed on a character region corresponding to a decimal point to enhance accuracy, the numerical value reading region 50 is divided into character regions $54_1$ to $54_3$ corresponding to numerals and a character region $54_4$ corresponding to a decimal point. A character $52_1$ (number "4") is recognized in the character region $54_1$, a character $52_2$ (number "6") is recognized in the character region $54_2$, and a character $52_3$ (number "7") is recognized in the character region $54_3$. Further, a character $52_4$ (decimal point ".") is recognized in the character region $54_4$. As a combination of these recognitions, the numerical value of "4.67" is recognized.

However, in a case where the numerical value includes a sign such as a decimal point, it is sometimes difficult to divide the numerical value reading region 50 into a character region corresponding to one character. Further, in a numerical value input through handwriting, it is difficult to perform recognition by a habitual handwriting or the like. Even in the example shown in FIG. 6A, recognition is difficult since the decimal point is small, and discrimination between "6" and "8" is difficult. For example, as shown in FIG. 6B, if the numerical value reading region 50 is divided into the character regions $54_1$ to $54_3$ corresponding to numerals, "467" may be recognized. Accordingly, according to the character recognition, plural recognition candidates besides "4.67" are obtained.

As shown in FIG. 7A, in the character recognition process before the numerical value recognition process is performed, as recognition candidates of the numerical value 52, "467", "4.67", "487", "4.87", "46.7" and the like are obtained. These numerical values are determined to have high potentiality in the written order. That is, in the result of the character recognition before the numerical value recognition process is performed, the numerical value 52 is recognized as "467". The determination of "potentiality" in the character recognition may be performed by calculation of similarity as an image using a feature value, for example. As the similarity is high, the potentiality is increased.

As shown in FIG. 5B, in the present embodiment, the numerical value range of the numerical value 52 is set to the range of 1.00 to 5.00. Accordingly, as shown in FIG. 7B, in the character recognition process after the numerical value recognition process is performed, "467", "487" and "46.7" are excluded from the recognition candidates, the recognition candidates are narrowed to "4.67" and "4.87". These numerical values are determined to have high potentiality in the written order. That is, in the result of the character recognition after the numerical value recognition process is performed, the numerical value 52 is recognized as "4.57". As described above, in the present embodiment, the recognition candidates are selected by the character recognition and the numerical value recognition.

Returning to FIG. 4, in step 218, it is determined whether the numerical value recognition process is completed with respect to the entire numerical value reading regions 50. In a case where the numerical value recognition process is completed with respect to the entire numerical value reading region 50, the procedure proceeds to step 220. In a case where there is the numeral value reading region 50 that the numerical value recognition process is not completed, the procedure returns to step 208, and then, the procedure of steps 208 to 218 is repeated.

Next, in step 220, a final result of the character recognition is obtained reflecting the character recognition result after the numerical value recognition process is performed, and then the routine is terminated. In the present embodiment, by performing the numerical value recognition process, the plural recognition candidates are narrowed to the numerical value range, and thus, the numerical value recognition rate is improved.

In the above process, an example in which the numerical value reading region is extracted from the character image including the numerical value and the numerical value range is set for each extracted region is described, but for example, a numerical value range may be set with respect to a numerical value reading region before a numerical value is written, as in a numerical value column of a business form. In this case, a text image that includes the numerical value region is displayed in an image display unit as a format. Before the numerical value is written, the numerical value range is set with respect to each numerical value reading region.

Further, the text image after the numerical value is written is obtained. For example, a sheet on which a text image having a numerical value column is printed is distributed to a user, and a numerical value is written in the numerical value column by the user. The sheet on which the numerical value is written is optically read, and the text image including the numerical value is obtained. With respect to the text image having the numerical value, a "numerical value recognition process" is performed in a similar way to steps 208 to 220 in FIG. 4.

The configuration of the character recognition apparatus and the program described in the respective embodiments is an example, and may be modified in a range without departing from the spirit of the invention.

For example, in the above embodiments, an example in which the numerical value range is set by the lower limit value and the upper limit value is described, but the setting method of the numerical value range is not limited thereto. The numerical value range may be set by the number of digits of the numerical value such as four digits or five digits. For example, in the case of four digits, 1000 to 9999 are set to the numerical value range. Further, the numerical value range may be set as significant figures using significant digits such as four digits or five digits after the decimal point. For example, in a case where significant figures are four digits after the decimal point, the recognition rate is also enhanced with respect to a numerical value including a sign that represents the number of digits or positive and negative, such as $0.1320 \times 10^6$.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A character recognition apparatus comprising a processor specifically configured to function as:
    an extracting unit that extracts a numerical value reading region in which a numerical value, which is a character string of a numeral, is read from an image that is a character recognition target;
    a character recognizing unit that performs character recognition on the extracted numerical value reading region and thereby obtains, based on the extracted numerical value reading region, a plurality of recognition candidates for the numerical value; and
    a selecting unit that compares the numerical values of the plurality of recognition candidates to a numerical value range set for the numerical value reading region and selects, from the plurality of recognition candidates, a plurality of potential candidates that are within the set numerical value range.

2. The character recognition apparatus according to claim 1,
    wherein the numerical value range is set by an upper limit value and a lower limit value of the numerical value.

3. The character recognition apparatus according to claim 1,
    wherein the numerical value range is set by a number of digits of the numerical value.

4. The character recognition apparatus according to claim 1,
    wherein the numerical value range is set by a number of significant digits of the numerical value.

5. A non-transitory computer readable medium storing a program causing a computer to execute a process, the process comprising:
    extracting a numerical value reading region in which a numerical value, which is a character string of a numeral, is read from an image that is a character recognition target;
    performing character recognition on the extracted numerical value reading region and thereby obtaining, based on the extracted numerical value reading region, a plurality of recognition candidates for the numerical value; and
    comparing the numerical values of the plurality of recognition candidates to a numerical value range set for the numerical value reading region and selecting, from the plurality of recognition candidates, a plurality of potential candidates that are within the set numerical value range.

6. A character recognition method performed by a processor, the method comprising:
    extracting a numerical value reading region in which a numerical value, which is a character string of a numeral, is read from an image that is a character recognition target;
    performing character recognition on the extracted numerical value reading region and thereby obtaining, based on the extracted numerical value reading region, a plurality of recognition candidates for the numerical value; and
    comparing the numerical values of the plurality of recognition candidates to a numerical value range set for the numerical value reading region and selecting, from the plurality of recognition candidates, a plurality of potential candidates that are within the set numerical value range.

7. The character recognition apparatus according to claim 1,
    wherein the number of potential candidates constituting the plurality of potential candidates is less than the number of recognition candidates constituting the plurality of recognition candidates.

8. The non-transitory computer readable medium according to claim 5,
    wherein the number of potential candidates constituting the plurality of potential candidates is less than the number of recognition candidates constituting the plurality of recognition candidates.

9. The character recognition method according to claim 6,
    wherein the number of potential candidates constituting the plurality of potential candidates is less than the number of recognition candidates constituting the plurality of recognition candidates.

10. The character recognition apparatus according to claim 1,
    wherein the extracting unit extracts a plurality of the numerical value reading regions, and
    a different numerical value range is set for each of the plurality of numerical value reading regions.

11. The non-transitory computer readable medium according to claim 5,
    wherein a plurality of the numerical value reading regions are extracted, and
    wherein a different numerical value range is set for each of the plurality of numerical value reading regions.

12. The character recognition method according to claim 6,
    wherein a plurality of the numerical value reading regions are extracted, and
    wherein a different numerical value range is set for each of the plurality of numerical value reading regions.

* * * * *